Jan. 10, 1928.
W. C. DUMM
1,655,536
THREE-WAY RIGGING PLATE
Filed Jan. 10, 1927
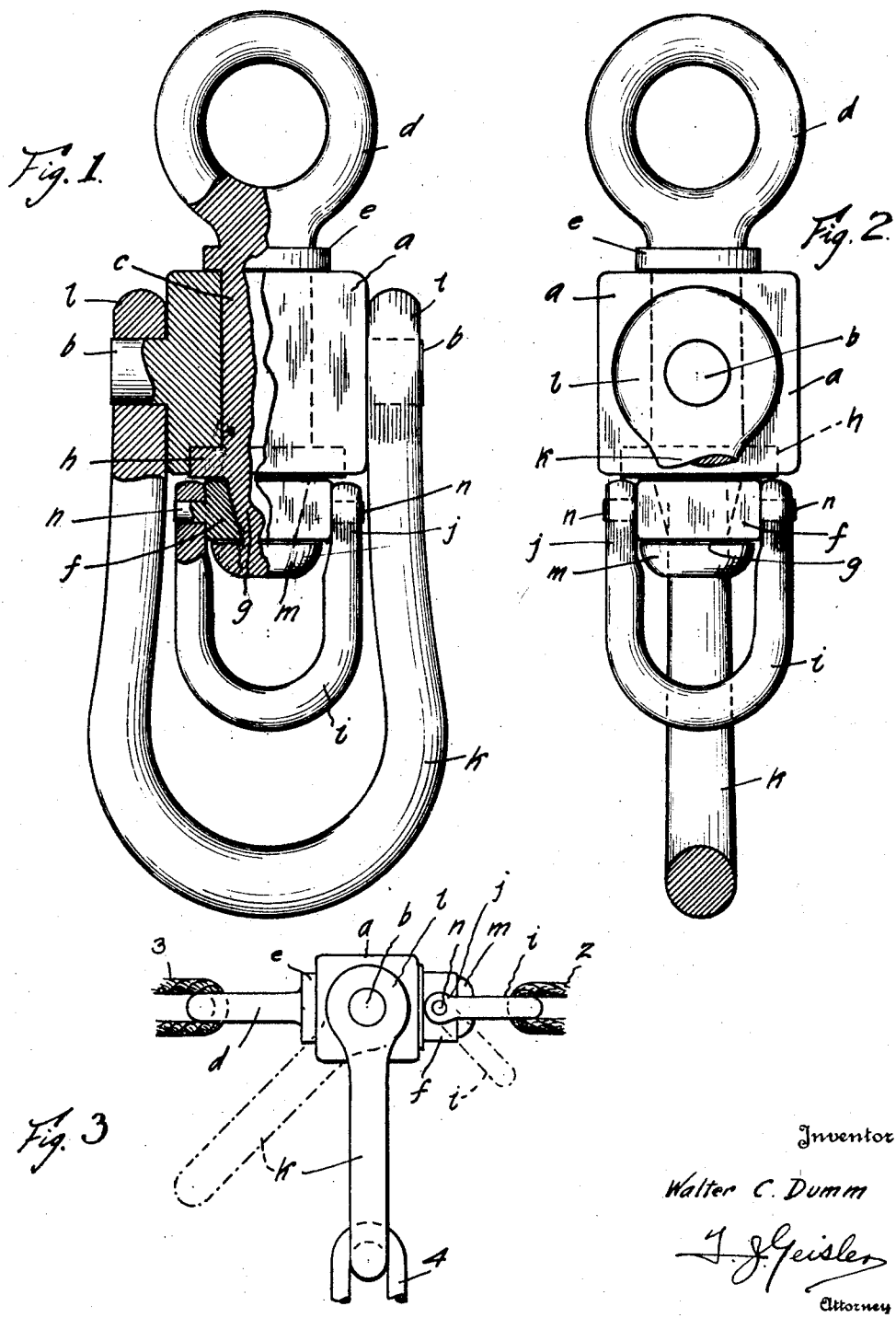
Inventor
Walter C. Dumm
J. J. Geisler
Attorney Patented Jan. 10, 1928.

1,655,536

UNITED STATES PATENT OFFICE.

WALTER C. DUMM, OF PORTLAND, OREGON.

THREE-WAY RIGGING PLATE.

Application filed January 10, 1927. Serial No. 160,149.

My invention relates to so-called "three-way rigging" or "section" plates used in logging operations for connecting the main line, and the haul-back line, and suspending the butt chains or tag-lines.

Due to the twist that inadvertently gets into one or the other, or both, of said lines, causing such lines to twirl around when the pull is exerted on them, the butt chains frequently are swung around and are wrapped about the lines, and get into a tangle, which is not only annoying, but causes loss of time. The cause of such undesirable results was because no provision was made in the plates, as heretofore constructed, to permit the end eyes, or other line securing elements, to swivel independently, relatively to each other.

The object of my invention is to prevent such twirling, wrapping, and tangling by providing a three-way plate in which said lines are fastened to the plate by means permitting each line independent relative rotation of the other connections to said three-way plate.

A further object of my invention is to provide a three-way rigging plate in which the frictional pressures imposed upon the swiveling parts will be prevented from being unduly increased by the force of the pull imposed upon them in opposite direction; thus preventing "freezing" of one, or the other, of the swiveling parts which would interfere with their functioning as designed by me. The same imperfection in three-way rigging plates, as heretofore constructed, also tended to cause one of the swiveling parts to wear into cone-shape and become loose and thus set up a swaging action and introduce breaking strains.

Incidentally, my invention has for its purpose to provide a strong device capable of being manufactured at a reasonable cost.

I attain the above enumerated objects by my three-way rigging plate comprising a block provided with a bore in which bears a swivel-pin, the opposite ends of which have forged thereon collars bearing on the adjacent faces of the block, thereby to sustain the pulling strains to which the swivel-pin is subjected, a fastening element, for example, an eye, is provided on one end of the swivel-pin, and a collar is rotatably mounted on its opposite end exterior of the adjacent flange of the swivel-pin; the extremity of the latter end of the swivel-pin being headed to retain the collar in place; and clevises are pivoted to the block and said collar, respectively one within the other.

My invention in its details may be manufactured in various ways, and by various methods. But it will suffice to illustrate one embodiment of my invention, and from such the modifications that may be made, within the scope of my invention, will be self suggestive, and they are best left to the judgment of the manufacturer, and his designers.

The principle of construction and operation of my improved three-way plate is illustrated in the accompanying drawings, in which:

Fig. 1 shows a general view of my improved three-way plate partly in section to illustrate the arrangement and assembly of its parts;

Fig. 2 shows a similar general view with the parts relatively arranged in different position than as shown in Fig. 1, thereby to illustrate the working of my device; and Fig. 3 shows a fragmentary view of my improved three-way plate illustrating its use in logging operations.

My "three-way rigging" or "section" plate comprises a block or cross-head $a$ centrally bored parallel with the ends of the block, and provided with trunnions $b$ centrally located on each end of the block. A swivel pin $c$ is provided bearing in the bore of the cross-head $a$, and said pin is provided at one end with an eye $d$, and a circumferential flange $e$, the flange $e$ bearing against the cross-head, and with another circumferential flange $h$ which bears flush with the block in a space $h'$ provided in the block. The other end of the swivel pin $c$ is frusto-conical in shape as at $g$, between the flange $h$ and a head $m$ provided on the end of the pin $c$, and a collar $f$ provided with a converging interior face is adapted to fit over the end portion $g$ of the pin.

The collar $f$ is provided with oppositely arranged trunnions $n$ over which eyes $j$, provided on each end of a clevis $i$ are adapted to fit, and the larger clevis $k$ is also provided with eyes $l$ which are adapted to fit over the trunnions $b$, the smaller clevis $i$ being arranged to rotate within the space enclosed by the larger clevis.

The parts of my rigging plate will be assembled at the factory. In order to permit such assembly, the swivel-pin is made of soft steel, and of such form and proportions as to permit the forging of the flanges *e* and *h* on its opposite ends. The swivel-pin is then inserted in the bore of the block *a* and thereupon the flanges *e* and *h* are forged. The flange *h* is preferably seated in a recess therefor, provided at the adjacent end of the block *a*. The rotatable collar *f* is then placed on the conical extension *g* of the swivel-pin, and finally the extremity of the swivel-pin at *m* is headed, so as to hold the collar *f* in place.

After such assembly, the swivel-pin and block *a* may be treated to render them of the proper hardness and toughness to sustain the severe duty to which they will be subjected.

In operation the main line 3 is attached to the eye *d*, the haul-back line 2 to the clevis *i*, and the choker, butt chain or tag-line 4 is fastened to the clevis *k*.

As the haul-back line returns the main line back into the woods, the twisting of the lines will be compensated by the clevis *i* to which the haul-back line is fastened as it will turn freely on the swivel pins *c*, and also by the free turning of the cross-head *a* upon the pin *c* to which the main line 3 is fastened by the eye *d*, thus the clevis *k*, to which a choker or butt chain is fastened will be independent of the rotary movement of the two lines, since the cross head *a* also moves freely on the pin *c*, and it will not be twisted and wrapped around the main line, or haul-back line.

The strains imposed on the section plate and in fact all parts of the rigging are tremendous, in fact all the various parts must be strong enough to pull a log ten feet in diameter and twenty-four feet long out of the brush and carry it along suspended in the air.

The flanges *e* and *h* are provided to sustain the pressure exerted by either of the lines as they move in one direction or the other, and the flange *h* also is provided to prevent the collar *f* from being clamped between the flange *m* and the cross-head, and becoming fixed or "frozen" to the pin *c*.

The frusto-conical portion *g* of the pin *c* is provided so that the strain of the main line or haul-back against the butt chain or choker will tend to hold the collar *f* against the head *m* away from the pin *c*, the space between the head *m* and flange *h* being slightly larger than the collar *f*, in this way preventing the collar *f* from wearing the pin *c* so as to tend to create a swaging or binding action.

I have pivoted the clevises *k* and *i* on their respective trunnions so as to provide the desirable flexibility in my section plate as shown in Fig. 3, which is necessary for the efficient functioning of the rigging as it operates under various conditions.

I claim:

1. A three-way rigging plate comprising a substantially rectangular block provided with a bore alined with the axis perpendicular to one side of the block, and further provided with trunnions alined with the axis of the block normal to the first mentioned axis, a swivel-pin bearing in said bore, the ends thereof projecting beyond opposite sides of said block, said pin provided with circumferential flanges arranged to bear on adjacent portions of the block and adapted to bear the pulling strains imposed upon the swivel-pin, an eye formed at one end of said swivel-pin, a collar rotatably secured on the opposite end of said swivel-pin, said collar provided with lateral trunnions, a clevis pivoted on the trunnions of said block, and a smaller clevis pivoted on the trunnions of said collar, the latter clevis being adapted to be rotated with said collar on the said swivel-pin within the space encompassed by the clevis pivoted on the trunnions of the said block.

2. A three-way rigging plate comprising a block provided with a bore and with lateral trunnions on two opposite sides parallel with said bore, a swivel-pin bearing in said bore and projecting beyond the said block, a circumferential flange forged on each end of said swivel-pin and bearing on adjacent portions of the block, thereby to sustain the pulling strains imposed upon the swivel-pin, one end of the swivel-pin being formed with a fastening element and the other end with an extension, a collar rotatably mounted on such extension, the extremity of said extension being headed to retain said collar in place, said collar provided with lateral trunnions, a clevis pivoted on the trunnions of said block, and a smaller clevis pivoted on the trunnions of said collar within the space of the first mentioned clevis.

3. A three-way rigging plate comprising a block provided with a bore and with lateral trunnions on two opposite sides parallel with said bore, a swivel-pin bearing in said bore and projecting beyond the said block, a circumferential flange forged on each end of said swivel-pin and bearing on adjacent portions of the block, thereby to sustain the pulling strains imposed upon the swivel-pin, the face of the block at one end of said bore being provided with a recess, and one of the flanges of the swivel-pin bearing in such recess, one end of the swivel-pin being formed with a fastening element and the other end with an extension, a collar rotatably mounted on such extension, the extremity of said extension being headed to retain said collar in place, said collar provided with lateral trunnions, a clevis pivoted on the trunnions of said block, and a smaller clevis pivoted on the trunnions of said collar within the space of the first mentioned clevis.

4. A three-way rigging plate comprising a block provided with a bore and with lateral trunnions on two opposite sides parallel with said bore, a swivel-pin bearing in said bore and projecting beyond the said block, a circumferential flange forged on each end of said swivel-pin and bearing on adjacent portions of the block, thereby to sustain the pulling strains imposed upon the swivel-pin, one end of the swivel-pin being formed with a fastening element and the other end with a conical extension, a collar rotatably mounted on such extension, the extremity of said extension being headed to retain said collar in place, said collar provided with lateral trunnions, a clevis pivoted on the trunnions of said block, and a smaller clevis pivoted on the trunnions of said collar within the space of the first mentioned clevis.

5. A three-way rigging plate comprising a block provided with a bore and with lateral trunnions on two opposite sides parallel with said bore, a swivel-pin bearing in said bore and projecting beyond the said block, a circumferential flange forged on each end of said swivel-pin, and bearing on adjacent portions of the block, thereby to sustain the pulling strains imposed upon the swivel-pin, the face of the block at one end of said bore being provided with a recess, and one of the flanges of the swivel-pin bearing in such recess, one end of the swivel-pin being formed with a fastening element and the other end with a conical extension, a collar rotatably mounted on such extension, the extremity of said extension being headed to retain said collar in place, said collar provided with lateral trunnions, a clevis pivoted on the trunnions of said block, and a smaller clevis pivoted on the trunnions of said collar within the space of the first mentioned clevis.

6. A three-way rigging plate, comprising a block provided with a bore, a swivel-pin bearing in said bore, the opposite ends of said swivel-pin having forged thereon collars bearing on the adjacent faces of the block, thereby to sustain the pulling strains to which the swivel pin is subjected, a fastening element provided on one end of the swivel-pin, and a collar rotatable mounted on the opposite end of the swivel-pin exterior of the adjacent flange of the latter, the extremity of the swivel-pin being headed to retain said collar in place; and clevises pivoted to the block and said collar respectively, one within the other.

WALTER C. DUMM.